United States Patent
Mallisetty et al.

(10) Patent No.: US 9,684,507 B2
(45) Date of Patent: Jun. 20, 2017

(54) EFFECTIVE DEFECT MANAGEMENT ACROSS MULTIPLE CODE BRANCHES

(71) Applicant: CA, Inc., New York, NY (US)

(72) Inventors: Ramanjaneyulu Mallisetty, Ronkonkoma, NY (US); Naveen Arora, Hyderabad (IN); Steven C. Versteeg, Ivanhoe (AU); Xien Yao, Melbourne (AU)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/673,967

(22) Filed: Mar. 31, 2015

(65) Prior Publication Data

US 2016/0291970 A1    Oct. 6, 2016

(51) Int. Cl.
  G06F 9/44       (2006.01)
  G06F 11/36      (2006.01)

(52) U.S. Cl.
  CPC .................. G06F 8/71 (2013.01); G06F 8/77 (2013.01); G06F 11/368 (2013.01)

(58) Field of Classification Search
  CPC ................................. G06F 8/71; G06F 11/368
  USPC ........................................................ 717/121
  See application file for complete search history.

(56) References Cited

U.S. PATENT DOCUMENTS

| | | | |
|---|---|---|---|
| 7,603,393 B1 * | 10/2009 | Cote ......................... | G06F 8/71 |
| 2004/0154001 A1 * | 8/2004 | Haghighat .......... | G06F 11/3688 |
| | | | 717/130 |
| 2008/0120602 A1 * | 5/2008 | Comstock ........... | G06F 11/3688 |
| | | | 717/125 |
| 2010/0058294 A1 * | 3/2010 | Best ..................... | G06F 11/3688 |
| | | | 717/122 |
| 2014/0282411 A1 * | 9/2014 | Liemandt ............ | G06F 11/3672 |
| | | | 717/124 |
| 2015/0161028 A1 * | 6/2015 | Chan ................... | G06F 11/3676 |
| | | | 717/130 |

OTHER PUBLICATIONS

Bai et al., "Adaptive Web Services Testing", IEEE, 2007, 4pg.*
CA Technologies, "CA Harvest Software Change Manager—Administrator Guide", Release 12.5, 2013, 314pg.*
CA Technologies, "CA Harvest Software Change Manager—Plug-In for Eclipse User Guide", Release 12.5, 2013, 233pg.*

(Continued)

*Primary Examiner* — Ryan Coyer
(74) *Attorney, Agent, or Firm* — Coats & Bennett, PLLC

(57) ABSTRACT

A computer-implemented method is disclosed which detects that new source code linked to a defect identifier has been checked in to a source code repository for a given code branch of a software application. The new source code is automatically checked in to additional code branches of the software application based on the defect identifier. For each additional code branch into which the new source code is automatically checked in, code coverage metrics are determined which indicate an extent to which application source code of the code branch is tested by its corresponding test case source code before and after the automatic check in. If a difference between the code coverage metrics indicates that code coverage for the code branch has decreased by more than a predefined threshold, a notification is transmitted that indicates a test case deficiency for the code branch.

19 Claims, 10 Drawing Sheets

(56) References Cited

OTHER PUBLICATIONS

CA Technologies, "CA Harvest Software Change Manager—Workbench User Guide", Release 12.5, 2013, 300pg.*
Tracey et al., "An Automated Framework for Structural Test-Data Generation", IEEE, 1998, 10pg.*
Wegener et al., "Evolutionary test environment for automatic structural testing", Elsevier Science, 2001, 15pg.*
Software Configuration Management and Agile Software Development. "Quick Tips on Branching Patterns from an Expert." Accurev Blog, Retrieved from the internet: URL: http://accurev.com/bog/tag/change-sets/ [retrieved Dec. 3, 2014]; Feb. 10, 2012, pp. 1-5.
Zhang et al. "Branch Management and Atomic Merge in a Continuous Integration Environment." EMC White Paper, EMC Corporation, Jul. 22, 2013, pp. 1-13.

* cited by examiner

| Element | Missed Instructions | Cov. | Lines |
|---|---|---|---|
| ⓒ ModuleWrapper | | 54% | 1,671 |
| ⓒ NodeManagerImpl | | 22% | 709 |
| ⓒ LogConfigModule | | 56% | 595 |
| ⓒ NodeImpl | | 76% | 893 |
| ⓒ Log4jConfigurationHelper | | 42% | 455 |
| ⓒ NLS | | 67% | 479 |
| ⓒ ConfiguratorImpl | | 53% | 305 |
| ⓒ Delta | | 43% | 250 |
| ⓒ NLSPeerSynchronizer.new Runnable() {...} | | 0% | 104 |
| ⓒ SingletonModuleWrapper | | 24% | 182 |
| ⓒ DeltaProcessor | | 66% | 344 |
| ⓒ NLSPeerSynchronizer.new Runnable() {...} | | 0% | 56 |
| ⓒ ModuleExceptionHandler | | 0% | 68 |
| ⓒ NLSPeerListManager | | 25% | 71 |
| ⓒ ModeImpl.NodeJSMListenerImpl.new Thread() {...} | | 0% | 42 |
| ⓒ NodeMgr | | 74% | 210 |
| ⓒ NLSPeerSynchronizer | | 12% | 65 |
| ⓒ InitialCacheSubscriber.InitialCacheEnumeration | | 0% | 47 |
| ⓒ InterceptorChainImpl | | 66% | 88 |
| ⓒ ModuleDescriptorWrapper | | 56% | 85 |
| ⓒ DeltaProcessor.DeltaThread | | 71% | 83 |
| ⓒ NLS.KeepAliveThread | | 45% | 43 |
| ⓒ DeltaProcessor.CacheSubscriber | | 65% | 83 |
| ⓒ SingletonModuleWrapper.SecuredCallbackHandler | | 0% | 40 |
| ⓒ GETResultCallback.PhaseTwoThread | | 51% | 46 |
| ⓒ ModuleDeltaCache | | 80% | 156 |
| ⓒ NLSPeerListManager.new Runnable() {...} | | 0% | 24 |
| ⓒ InitialCacheSubscriber.MaxIdleCheckThread | | 10% | 33 |
| ⓒ ModuleWrapper.OutboundEnumeration | | 63% | 46 |

FIG. 6

| Element | Missed Instructions | Cov. | Lines |
|---|---|---|---|
| ⊙ execute(String, Collection) | | 0% | 26 |
| ⊙ initializeEllInterceptor() | | 35% | 54 |
| ⊙ start(String, Collection, OperationListenerEx, String) | | 0% | 16 |
| ⊙ recover(String, DataObject, OperationListener, String) | | 0% | 23 |
| ⊙ enumerate(DataObject, UUID) | | 42% | 67 |
| ⊙ start(String, DataObject, DataObject, OperationListener, String) | | 0% | 24 |
| ⊙ getMetadata(MetadataProvider,MetadataType, String[]) | | 38% | 33 |
| ⊙ abort(String) | | 0% | 20 |
| ⊙ forget(String) | | 0% | 20 |
| ⊙ execute(String, DataObject, DataObject) | | 0% | 23 |
| ⊙ restart() | | 0% | 19 |
| ⊙ shutdown() | | 61% | 64 |
| ⊙ get(DataObject) | | 39% | 48 |
| ⊙ setOperationListener(String, String, OperationListener) | | 0% | 18 |
| ⊙ subscribeToEvents(String, DataObject, Object, ConnectorEventSubscriber) | | 0% | 20 |
| ⊙ handleException(Throwable, int) | | 54% | 45 |
| ⊙ getEntities(DataObject, EntityManager) | | 50% | 28 |
| ⊙ getEarliestAvailableBookmark() | | 0% | 15 |
| ⊙ updateConfiguration(DataObject, ChangeSummary) | | 0% | 14 |
| ⊙ setProperty(String, Object) | | 0% | 14 |
| ⊙ getServiceItemsRecursively(String) | | 46% | 21 |
| ⊙ start(String, DataObject, OperationListener, String) | | 65% | 24 |
| ⊙ onError(InvalidDataException) | | 0% | 9 |
| ⊙ delete(DataObject) | | 60% | 23 |
| ⊙ subscribeToErrors(String, ErrorListener) | | 67% | 26 |
| ⊙ unsubscribeFromErrors(String) | | 58% | 19 |
| ⊙ outBoundTransform(Collection, String) | | 57% | 25 |
| ⊙ subscribeRealyWithModule() | | 68% | 28 |
| ⊙ discover(DataObject) | | 60% | 20 |

FIG. 7

EFFECTIVE DEFECT MANAGEMENT ACROSS MULTIPLE CODE BRANCHES

TECHNICAL FIELD

The present disclosure relates to source code management, and more particularly to automatically checking in source code to a plurality of code branches of a software application.

BACKGROUND

A rising trend in software development is to change from the more traditional software development methodology known as "waterfall" to so-called "agile" software development methods. Due to this paradigm shift, product development lifecycle span is changing from months to weeks. Agile software development is known to be very accommodating of customer needs, and to adapt to changes in customer requirements, because it enables continuous delivery of a series of releases. The waterfall method, in contrast, delivers fewer releases that are spaced further apart in time. However, use of agile software development it also poses a number of challenges.

SUMMARY

According to one aspect of the present disclosure, a computer-implemented method is disclosed which detects that new source code linked to a defect identifier has been checked in to a source code repository for a given one of a plurality of code branches of a software application. The new source code comprises new application source code and new test case source code. The defect identifier identifies a defect in the software application that the new application source code resolves and the new test case source code tests. The new source code is automatically checked in to additional ones of the plurality of code branches based on the defect identifier. For each additional code branch into which the new source code is automatically checked in:
  a first code coverage metric is determined which is indicative of an extent to which application source code of the code branch was tested by its corresponding test case source code before the automatic check in of the new source code;
  a second code coverage metric is determined which is indicative of an extent to which application source code of the code branch is tested by its corresponding test case source code, which includes the new test case source code, after the automatic check in of the new source code; and
  if a difference between the first and second code coverage metrics indicates that code coverage for the code branch has decreased by more than a predefined threshold, a notification is transmitted that indicates a test case deficiency for the code branch.

According to another aspect of the present disclosure, a computing device is disclosed which comprises a memory circuit and a processing circuit operatively connected the memory circuit. The processing circuit is configured to detect that new source code linked to a defect identifier has been checked in to a source code repository for a given one of a plurality of code branches of a software application. The new source code comprises new application source code and new test case source code. The defect identifier identifies a defect in the software application that the new application source code resolves and the new test case source code tests.

The processing circuit is further configured to automatically check in the new source code to additional ones of the plurality of code branches based on the defect identifier. The processing circuit is further configured to, for each additional code branch into which the new source code is automatically checked in:
  determine a first code coverage metric indicative of an extent to which application source code of the code branch was tested by its corresponding test case source code before the automatic check in of the new source code;
  determine a second code coverage metric indicative of an extent to which application source code of the code branch is tested by its corresponding test case source code, which includes the new test case source code, after the automatic check in of the new source code; and
  if a difference between the first and second code coverage metrics indicates that code coverage for the code branch has decreased by more than a predefined threshold, transmit a notification that indicates a test case deficiency for the code branch.

According to another aspect of the present disclosure, a computer program product is disclosed which comprises a computer readable storage medium having computer readable program code embodied therewith. The computer readable program code comprises computer readable program code configured to detect that new source code linked to a defect identifier has been checked in to a source code repository for a given one of a plurality of code branches of a software application. The new source code comprises new application source code and new test case source code. The defect identifier identifies a defect in the software application that the new application source code resolves and the new test case source code tests. The computer readable program code comprises computer readable program code configured to automatically check in the new source code to additional ones of the plurality of code branches based on the defect identifier. The computer readable program code further comprises computer readable program code configured to, for each additional code branch into which the new source code is automatically checked in:
  determine a first code coverage metric indicative of an extent to which application source code of the code branch was tested by its corresponding test case source code before the automatic check in of the new source code;
  determine a second code coverage metric indicative of an extent to which application source code of the code branch is tested by its corresponding test case source code, which includes the new test case source code, after the automatic check in of the new source code; and
  if a difference between the first and second code coverage metrics indicates that code coverage for the code branch has decreased by more than a predefined threshold, transmit a notification that indicates a test case deficiency for the code branch.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 4 is a flowchart of an example determination of which code branches new source code should be automatically checked in to.

FIGS. 5-7 illustrate code coverage data for an example software application

DETAILED DESCRIPTION

Figure 1:
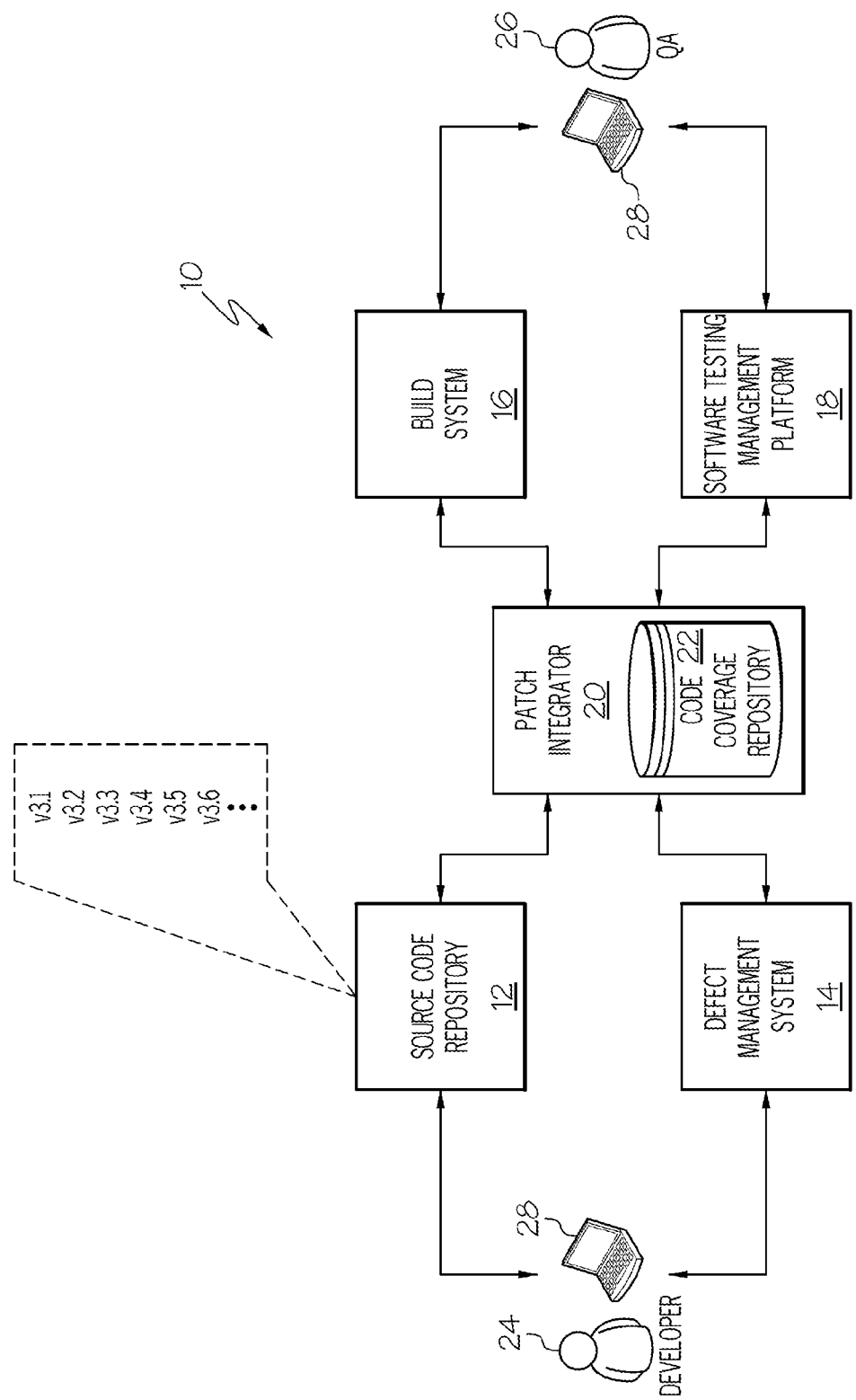
FIG. 1 illustrates a set of software development tools.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes techniques for automatically checking in source code (including application source code and test case source code) to a plurality of code branches of a software application, while also monitoring code coverage levels to ensure that code coverage of the software application is maintained at an acceptable level. If code coverage decreases below an acceptable threshold, then a notification can be transmitted to indicate the deficiency. These techniques can be used despite the disparate software development tools from different vendors that are often used by software developers.

When agile software development is used, short release cycles are implemented, which means that there can be multiple releases of a product to be maintained by developers. These multiple releases can take the form of code branches in a source code repository. This increase in code branches correspondingly increases the likelihood that a software defect (i.e., bugs) from a released version as reported by a customer may apply to previous or subsequent releases. This places a considerable burden on developers to handle software defects and updates effectively. The techniques discussed herein automatically identify impacted code branches and promote source code changes among affected code branches to more effectively handle software defect resolution.

Referring now to FIG. 1, a set 10 of software development tools are shown, which includes a source code repository 12, a defect management system 14, a build system 16, a software testing management platform 18, and a patch integrator 20. The source code repository 12 is used to store source code for code branches of a software application, including application source code (for running the software application) and test case source code (for testing the software application). The repository may also store resource files (e.g., images or configuration files) and/or binary files (e.g., dependencies such as DLLs) along with source code, for example. In the example of FIG. 1, the source code repository includes source code for a plurality of code branches v3.1, v3.2, v3.3, v3.4, v3.5, and v3.6 of a software application. One example commercially available source code repository product is Rational Team Concert (RTC) from IBM.

The defect management system 14 is used to track defects in the various code branches of the software application. For a given defect, the defect management system 14 can indicate a defect identifier (ID), a defect description, an indication of what code branches the defect is present in, and an indication of whether the defect has been resolved with new source code. Some example defect management systems include RTC and JIRA.

The build system 16 is used to compile the various code branches of the software application, including application and test case source code, from the source code repository 12. The build system 16 may also be used to execute tests cases to test the software application (e.g., using compiled test cast source code). To test the application, the build system may also use data from the software testing management platform 18. Some example build systems include TEAM CITY and MAVEN.

The software testing management platform 18 is used to track the results of executed test cases for the software application (e.g., whether tests have passed or failed for a given code branch). An example software testing management platform 18 includes QUALITY CENTER from HP.

Software developers 24 can interact with the source code repository 12 and defect management system 14 via their respective computing devices 28 to track software defects, and fix them by checking in new source code. Quality assurance (QA) engineers 26 can interact with the build system 16 and software testing management platform 18 via their respective computing devices 28 to ensure that a given code branch of the software application is running properly and has been adequately tested.

In a typical software development environment, the components 12-18 are executed on different servers. Quite commonly they are provided by different vendors and lack out of the box integration. The patch integrator 20 can provide missing integration between these components.

The patch integrator 20 communicates with the various components 12, 14, 16, 18 to detect when new source code is checked in to the source code repository 12 for a given one of a plurality of code branches of a software application, and to automatically check in that new source code (including application source code and test case source code) to other ones of the plurality of code branches, as will be described below. The patch integrator 20 is operatively connected to a repository 22 of historic code coverage data that is indicative of the extent to which various code branches of a software application are tested by their corresponding test case source code at various points in time. The patch integrator may also maintain an exclusion list that identifies code branches into which source code should not be automatically checked in.

Figure 2:
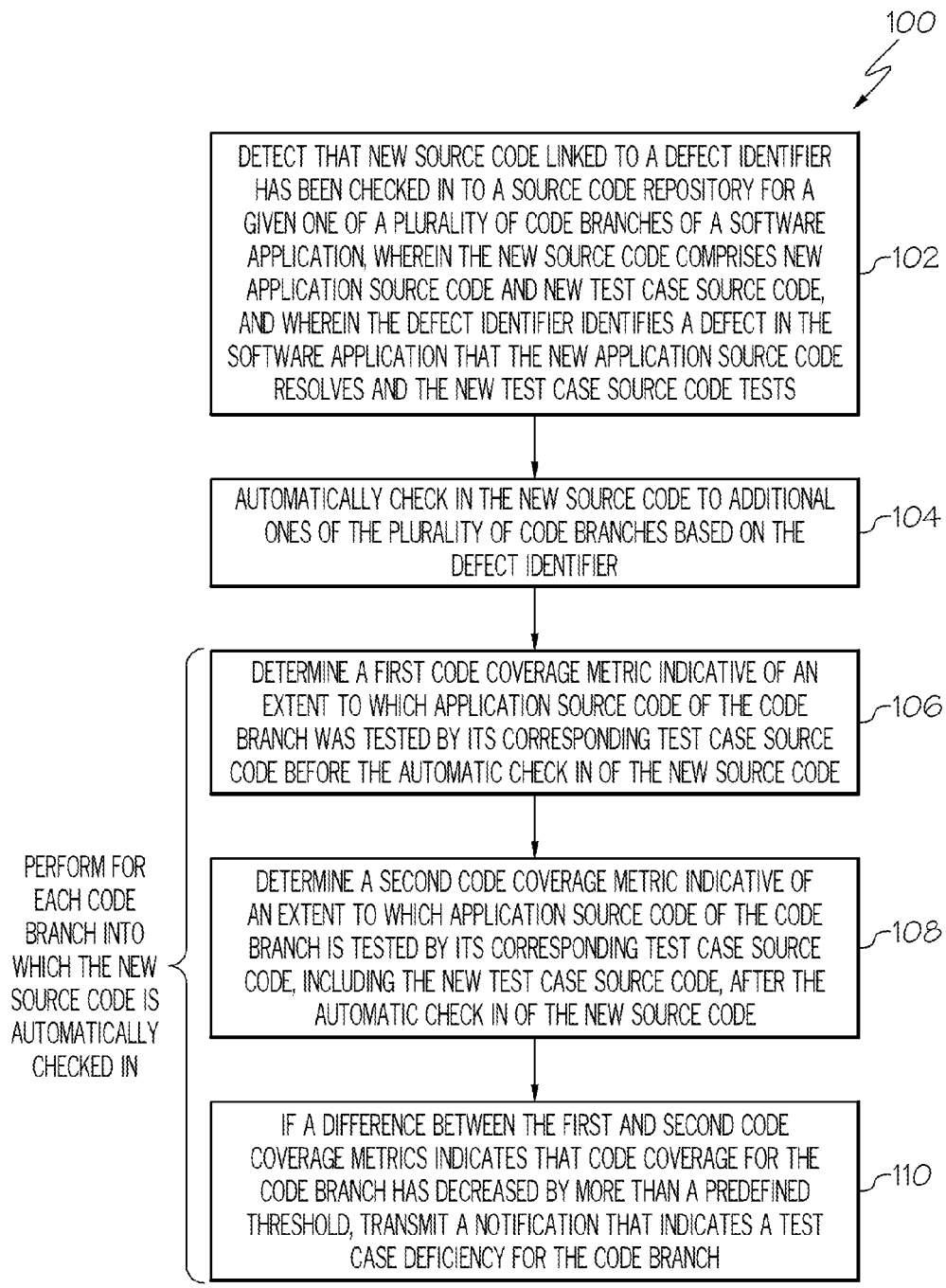
FIG. 2 is a flowchart of a computer-implemented method performed by a patch integrator.

FIG. 2 is a flowchart of a computer-implemented method 100 that is performed by the patch integrator 20. The patch integrator 20 detects (block 102) that new source code linked to a defect identifier has been checked in to source code repository 12 for a given one of a plurality of code branches of a software application, wherein the new source code comprises new application source code and new test case source code. The defect identifier identifies a defect in the software application that the new application source code resolves and the new test case source code tests. The patch integrator 20 automatically checks in the new source code to additional ones of the plurality of code branches based on the defect identifier (block 104). For each additional code branch into which the new source code is automatically checked in, the patch integrator 20:

determines a first code coverage metric (block 106) indicative of an extent to which application source code of the code branch was tested by its corresponding test case source code before the automatic check in of the new source code;

determines a second code coverage metric (block 108) indicative of an extent to which application source code of the code branch is tested by its corresponding test case source code, which includes the new test case source code, after the automatic check in of the new source code; and if a difference between the first and second code coverage metrics indicates that code coverage for the code branch has decreased by more than a predefined threshold, transmits a notification that indicates a test case deficiency for the code branch (block 110).

As used herein, the term "change set" will be used to refer to the files of application source code of a given code branch that are changed by a check in, or that are added by a check in. A given change set will include one or more files that are updated versions of files in a code branch. The new versions of existing files will be called "updated files." Also, the change set may also include new files that are added to the code branch and that were not already present in a code branch. These new files will be called "added files" because they are being added instead of updated.

Figure 3:
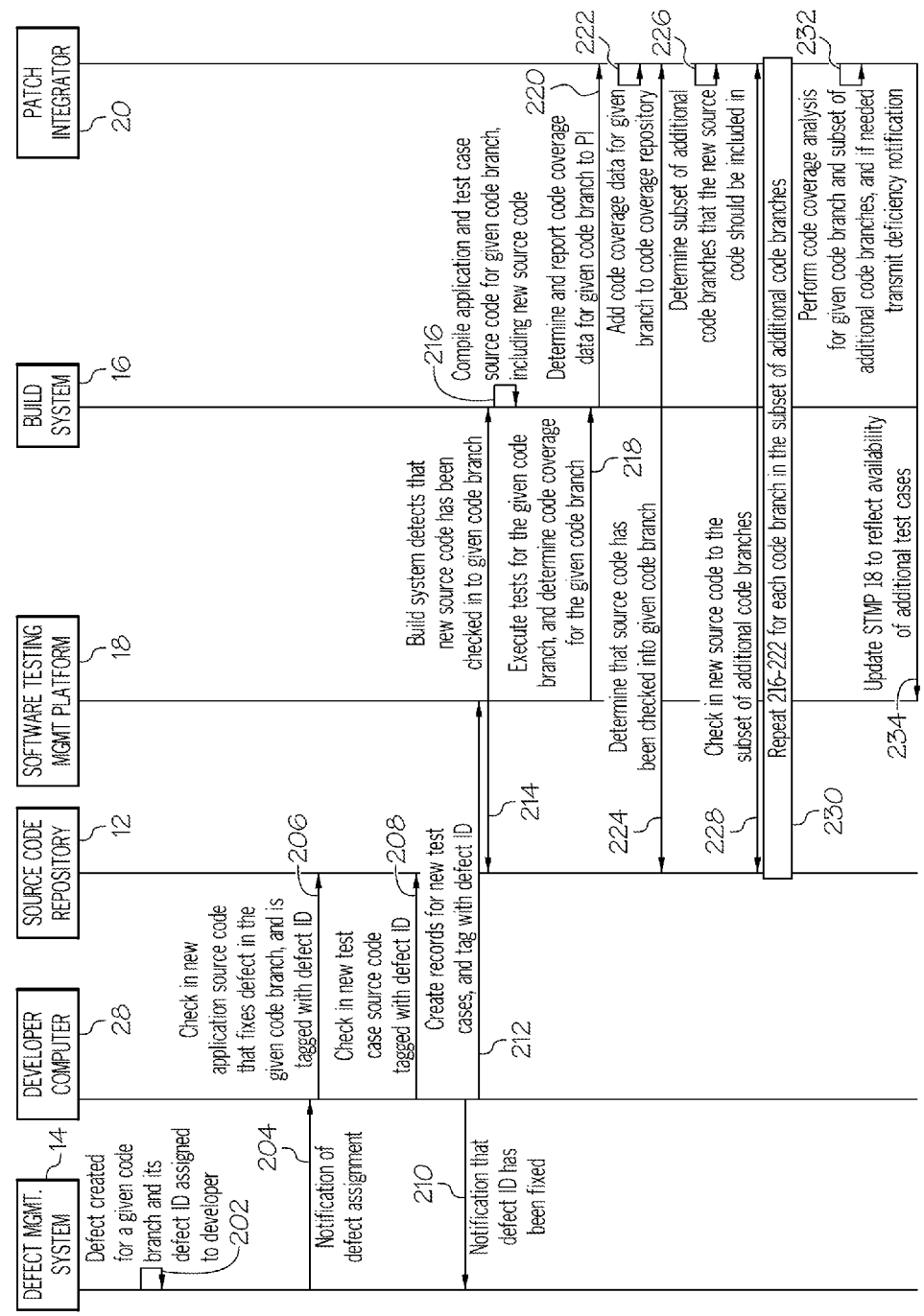
FIG. 3 illustrates a signaling diagram according to an embodiment of the method of FIG. 2.

FIG. 3 illustrates a signaling diagram according to an embodiment of the method 100 of FIG. 2. A defect is created (202) in defect management system 14 for a given one of a plurality of code branches of a software application. The defect has a defect identifier (ID) and that defect ID is assigned to a software developer 24. A notification of the assignment is transmitted (204) to a developer computing device 28 (e.g., via email or a short message service "SMS" message).

After creating application source code that resolves the defect in the given code branch, the developer checks in that new application source code into the source code repository 12 via the same or another computing device 28 (206). The new application source code is tagged with the defect ID to indicate that it resolves the defect identified by the defect ID. The developer 24 also checks in new test case source code into the source code repository 12 via the developer computing device 24 (208). The new test case source code tests the new application source code, and is also tagged with the defect ID. The new test case source code can be used to check for regression errors to ensure that the defect identified with the defect ID does not get reintroduced into the code branch of the software application in the future. The developer also transmits a notification to the defect management system 14 that the defect identified by the defect ID has been fixed (210). The notification of 210 can be transmitted via the same or another developer computing device 28.

The developer (or perhaps a quality assurance "QA" engineer) creates records for new test cases in the software testing management platform 18 (212). The new records identify tests in the new test case source code, and are also tagged with the defect ID. The software testing management platform 18 can use these records to store test results for the various tests.

The build system 16 detects that new source code has been checked in to the source code repository 12 for the given code branch (214), and compiles the source code for the given code branch (216), including the application source code and the test case source code. The build system 16 executes tests for the given code branch, and determines code coverage data for the given code branch (218), which is then reported to the patch integrator 20 (220). The patch integrator 20 stores the code coverage data in its code coverage repository 22 (222).

The patch integrator 20 determines that source code has been checked into the given code branch (224). This may be performed using Application Programming Interfaces (APIs) of the source code repository 12. The APIs could be used to obtain metadata of the source code (e.g., the defect ID that the code is associated with). The patch integrator 20 also determines a subset of the impacted code branches that the new source code should be merged into (226). This determination is performed at least partially based on the defect ID corresponding to the new source code.

Once the subset of code branches is determined, the patch integrator 20 automatically checks in the new source code into the subset of additional code branches (228). Each file in the change set that is an added file will be added to the subset of additional code branches. Each file in the change set that is an updated file will be updated in the subset of additional code branches. This updating could include merging changes into the existing file in the code branch, or could include replacing the existing file in the code branch.

The patch integrator 20 may also be configured to generate, based on the first and second code coverage metrics, a dashboard that displays historical code coverage data for the software application. The dashboard could be shown on an electronic display, for example, and may in some embodiments be accessible remotely (e.g., via a world wide web-based interface). The dashboard could be used to look up code current coverage data for a code branch and/or to view graphs of how code coverage has changed over time for a code branch, for example. In the same or another embodiment, the dashboard could be used to indicate a quantity of automatic updates that have been performed and/or a quantity of documented software defects that currently exist in each code branch. Thus, in some embodiments the dashboard could be used to indicate which check-ins improve code coverage numbers for code branches of a software application. In the same or other embodiments, the dashboard could be used to provide a development team with a list of defects reported by customers and their applicability in remaining versions of product—defects which could be automatically fixed by the patch integrator 20 across many code branches (228) once fixed in a single code branch (206).

Items 216-222 are repeated for each additional code branch in the subset of additional code branches (230). Thus, for each additional code branch, the application and test source code (including the new source code that has been automatically checked in) is compiled, testing is performed against the new build to determine code coverage data, and the patch integrator 20 stores that code coverage data in the code coverage repository 22. A code coverage analysis is performed for the given code branch and the subset of additional code branches, and if needed a deficiency notification is transmitted (232). Also, the software testing management platform 18 is automatically updated to reflect that additional test cases, which correspond to the new test case source code, are available for the additional ones of the plurality of code branches (234).

In one or more embodiments, performance of items 226-234 is contingent on the tests performed in item 218 being successful. If one or more of the tests failed, that could be indicative of a regression error being introduced in the new application source code checked in at 206. If one or more regression errors were present, it may be undesirable to check in the new application source code into other code branches, as that could cause the regression error to be propagated among the code branches. In one or more embodiments, the build of item 216 is a so-called "smoke build", and the new application source code and test case source code are not fully committed to the given code branch until the tests performed in item 218 are determined to be successful.

When checking in source code to the source code repository, developers may also check in resource files (e.g., images or configuration files) and/or binary files (e.g., dependencies such as DLLs) along with the new source code. In one or more embodiments, the patch integrator 20 is configured to check in these companion files along with the new source code into the subset of additional code branches.

Although the items 22-234 are shown in a particular order in FIG. 3, it is understood that some of those items could occur in different orders or perhaps concurrently. For example, in some embodiments, the determination that new source code has been checked in to the given code branch (224) may occur before items 216-222 occur.

Figure 4:
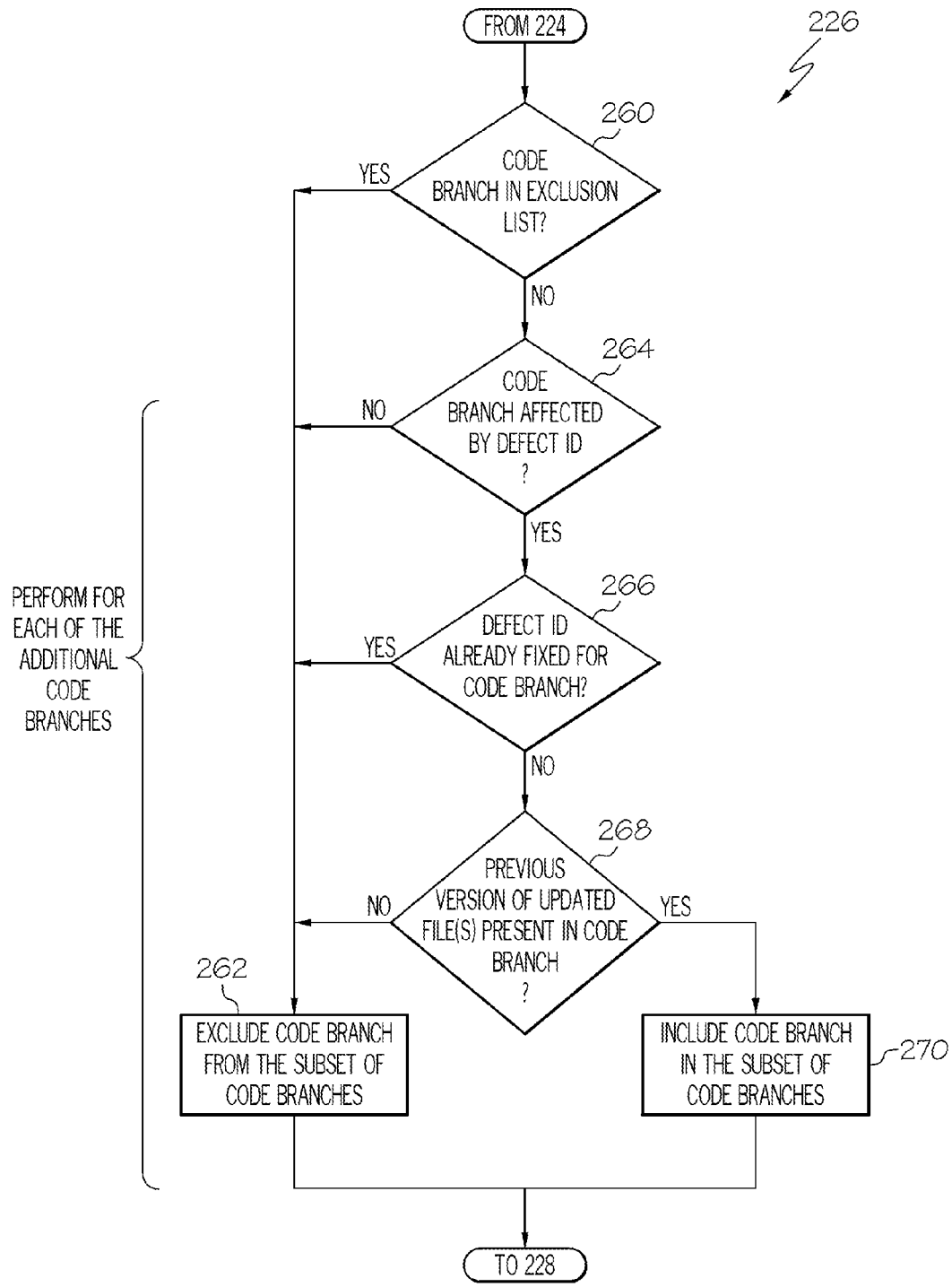

Items 226 and 232 of FIG. 3 will now be discussed in more detail. FIG. 4 is a flowchart of illustrates an example determination of which code branches new source code should be automatically checked in to (e.g., item 226 in FIG. 3). Blocks 260-270 in FIG. 4 are performed for each of the additional code branches of the software application to determine if the code branches will be included in the subset of additional code branches that the new source code will be automatically checked in to. A determination is made of whether the code branch is included in an exclusion list which indicates code branches into which application source code should not be automatically checked in (block 260). If the code branch is part of the exclusion list (a "Yes" to block 260), then the code branch is omitted from the subset (block 262). However, if the code branch is not part of the exclusion list (a "No" to block 262), then a determination is made of whether the code branch is affected by the defect ID (block 264). If the code branch is not affected by the defect ID (i.e., if the defect is not found in the code branch) (a "No" to block 264), then the code branch is omitted from the subset (block 262). However, if the code branch is affected by the defect ID (a "Yes" to block 264), then the patch integrator 20 proceeds to block 266.

In block 266, a determination is made of whether the defect ID has already been fixed for the code branch. If the defect ID has already been fixed for the code branch (a "Yes" to block 266), then the code branch is excluded from the subset (block 262). Otherwise, if the defect ID has not already been fixed for the code branch (a "No" to block 266), then a determination is made of whether a previous version of any of the updated file(s) is present in the code branch (block 268). If no previous version of any of the updated files is present in the code branch (a "No" to block 268), then the code branch is excluded from the subset (block 262). Otherwise, if a previous version of any of the updated files is present in the code branch (a "Yes" to block 268), then the code branch is included in the subset (block 270).

Thus, in some embodiments of the method 100 of FIG. 2, method 100 includes determining a set of files in the given code branch that are updated by the new application source code (i.e., the "updated files"), and determining which of the additional code branches that the new source code will be automatically checked in to based on the defect identifier, and also based on whether the set of files are already present in the additional ones of the plurality of code branches (block 268 of FIG. 4).

In some such embodiments, the determining of which additional code branches that the new source code will be automatically checked in to comprises determining that the new source code should not be automatically checked in to one of the plurality of code branches if none of the files in the set of files are present in the code branch (a "No" to block 268 in FIG. 4).

Also, in some embodiments, the determining of which additional code branches the new source code will be automatically checked in to is further based on an exclusion list which indicates code branches into which application source code should not be automatically checked in (see block 266 in FIG. 4).

Also, how the automatic check in is performed may depend on whether a file is an updated file or an added file. In some embodiments of the method 100, the method 100 includes determining whether the new application source code includes any new files that were not included in the given code branch before the check in of the new source code (i.e., any "added files"). In such embodiments, the automatic check in of the new source code to additional ones of the plurality of code branches based on the defect identifier (block 104) comprises:

for each file in the set of files, determining what changes were made to the file by the new application source code, and merging those changes into existing files in the additional ones of the plurality of code branches; and if the new application source code includes a new file, adding the new file to the additional ones of the plurality of code branches.

Performing a merge instead of a file replacement may be advantageous in certain scenarios. For example, it is possible that only a very small portion of a rather large file may be updated. Also, the file in question may vary between branches to some extent (e.g., there may be different dependencies or different formatting preferences being used). In such instances, merging the changes into the existing file may be preferable to simply replacing the file.

As with FIG. 3, although blocks 260-268 are shown in a particular order in FIG. 4, it is understood that some of those blocks could occur in a different order. For example, the determination of whether a code branch is part of the exclusion list (block 266) could precede the defect ID analysis of blocks 260-262 in some embodiments.

The "code coverage analysis" of item 232 of FIG. 3 will now be discussed in greater detail. The code coverage analysis of item 232 refers to blocks 106-110 of FIG. 2. In block 106, a first code coverage metric is determined which is indicative of an extent to which application source code of the code branch was tested by its corresponding test case source code before the automatic check in of the new source code. A second code coverage metric is also determined that is indicative of an extent to which application source code of the code branch is tested by its corresponding test case source code, which includes the new test case source code, after the automatic check in of the new source code (block 108).

As part of the code coverage analysis, a difference is determined between the first and second code coverage metrics (a "code coverage delta"). If the code coverage delta indicates that the second code coverage metric is greater than the first code coverage metric, then the patch integrator 20 assumes that a code coverage of the code branch being analyzed is sufficient. However, if the delta code coverage indicates that second code coverage metric is less than the first code coverage metric by an amount that exceeds a predefined threshold, then the patch integrator determines that the code branch being analyzed suffers from a code coverage deficiency, and a notification is transmitted (e.g., to QA engineer 26) to provide a notification.

In some embodiments, the predefined code coverage threshold is reconfigurable in the patch integrator 20. For example, for some entities a code coverage of 80% is considered acceptable, whereas for other entities that number may be too high or too low. Having reconfigurable code coverage thresholds can accommodate varying requirements among users of the patch integrator 20.

In some embodiments, the code coverage metric is limited to the change set. In such embodiments, the method 100 includes determining the change set comprising files in the given code branch that are either updated or added by the check in of the new source code. In such embodiments, neither of the first and second code coverage metrics reflects code coverage of files that are not present in the change set. To elaborate, the first code coverage metric reflects a code coverage of files of the change set before the automatic check in and does not reflect a code coverage of files outside of the change set. Additionally, the second code coverage metric reflects a code coverage of files of the change set after the automatic check in and does not reflect a code coverage of files outside of the change set. Thus, if there are 100 files of source code in a code branch and the change set includes 2 files, the code coverage data does not consider the remaining 98 files in the code branch. Of course, other embodiments could also be possible in which all source code was considered in determining the code coverage metrics.

Figure 5:
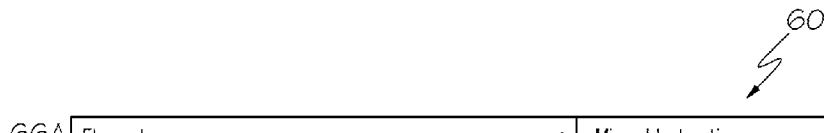

FIGS. 5-7 illustrate code coverage data for an example software application. FIG. 5 illustrates example code coverage data 60 at the package level, with each package representing a file of application source code. For example, the record 62A shows code coverage data for the file "com.ca.ucf.container" and indicates that there are 8,386 lines of application source code in this file, 55% of which are tested by corresponding test case source code. Similarly, the second entry 62B shows code coverage data for the file "com.ca.ucf.remote.odata" and indicates that there are 4,588 lines of application source code in this file, and that 37% of them are tested by corresponding test case source code.

Code coverage data may also be expressed at the class level (FIG. 6) or at the method level (FIG. 7). Referring to FIG. 6, code coverage data 64 is shown at the class level, with the understanding that a given "package" may have multiple classes. Thus, multiple ones of the classes in FIG. 6 could correspond to a single file. Entry 66A indicates that the class "ModuleWrapper" includes 1,671 lines of code, and that 54% of them are tested by corresponding test case source code. Record 66B indicates that class "NodeManagerImpl" has 709 lines of code, and that 22% of those lines are tested by corresponding test case source code.

Referring to FIG. 7, code coverage data 68 is shown at the method level, with the understanding that a single class could include multiple methods. Entry 70A indicates that the method "execute(String, Collection)" has 26 lines of code, none of which are tested. Record 70B indicates that the method "initializeElInterceptor( )" has 54 lines of source code, and that 35% of those lines are tested by corresponding test case source code.

The first and second code coverage metrics of FIG. 1 could be determined in a variety of ways. For example, they could be determined at the method level for only methods that are updated by the new application source code, for example. Or they could be determined at the class level for only classes that are updated by the new application source code. Or they could be determined at the package level for only packages that are updated by the new application source code. Alternatively, the metrics could be determined for all application source code of a given source code branch. Thus, there are number of possible embodiments of how the code coverage metrics could be calculated. Weighting could also be performed if desired (e.g., so that some methods or classes are considered more in determining the metric than other methods or classes).

New application source may be checked in to the source code repository 12, with the new application source code being tagged with a defect ID, but no corresponding test case source code is checked in for the defect ID. In some embodiments, when that occurs the patch integrator 20 detects that additional source code linked to an additional defect identifier has been checked into the source code repository for a particular one of the plurality of code branches, wherein the additional source code comprises application source code but does not include any test case source code. Based on this, the patch integrator 20 automatically checks in the additional source code to additional ones of the plurality of code branches based on the additional defect identifier, and queries the software testing management platform 18 to determine if any test case source code is available for the additional defect identifier. If no indication is received from the software testing management platform 18 that indicates that test case source code is available for the additional defect identifier after either a predetermined amount of time or a predetermined amount of querying, the patch integrator 20 transmits a notification that indicates a test case deficiency for the additional defect identifier (e.g., to QA engineer 26). An example of this is shown in FIG. 8.

Figure 8:
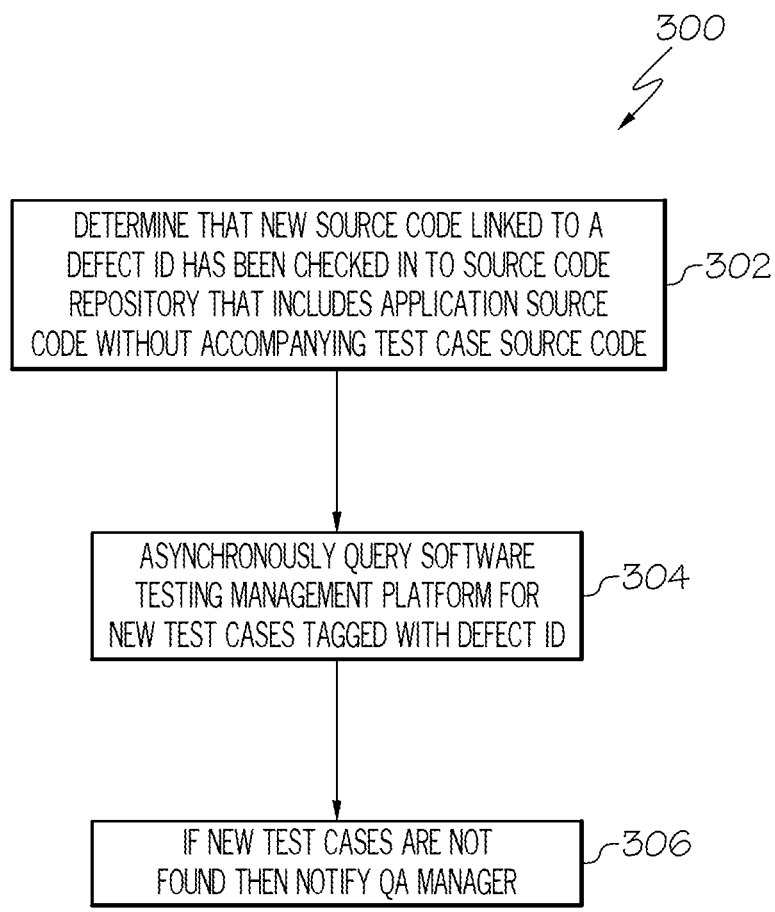
FIG. 8 is a flowchart of additional features that can be added to the method of FIG. 2.

FIG. 8 is a flowchart of additional features that can be added to the method 100 of FIG. 2. In particular, FIG. 8 illustrates a method 300 in which the patch integrator 20 determines that new source code linked to a defect ID has been check in to the source code repository 12 that includes application source code without any accompanying test case source code (block 302). The patch integrator asynchronously queries the software testing management platform 18 for new test cases tagged with the defect ID (block 304). If new test cases are not found (e.g., after a predefined quantity of queries or a predefined amount of time) then a notification is transmitted.

Figure 9:
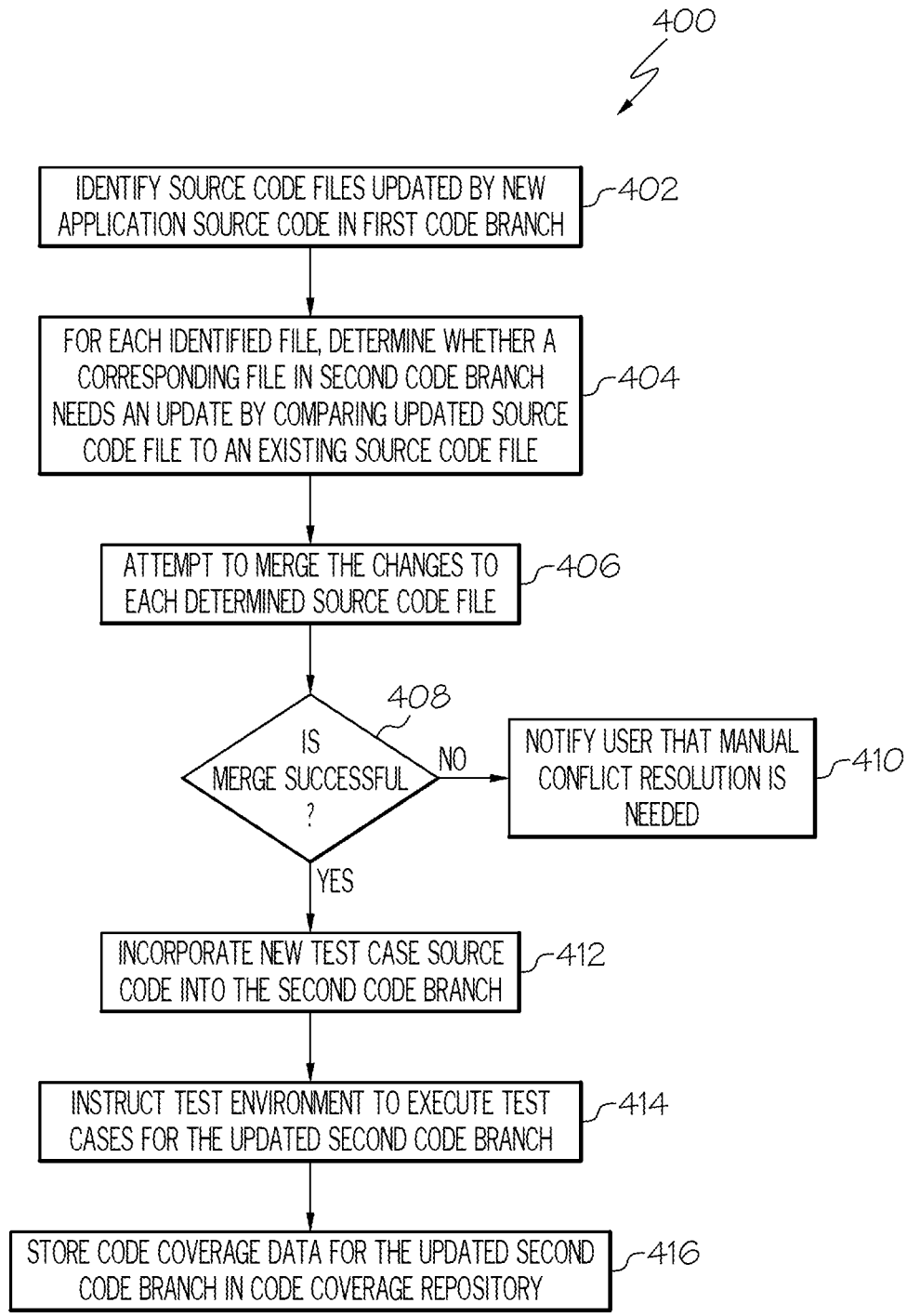
FIG. 9 is a flowchart of an example embodiment of aspects of the method of FIG. 2.

FIG. 9 is a flowchart of an example implementation of block 104 of FIG. 1. Assume that the determination of 226 (as shown in FIG. 4) or some variant of it has been performed to identify the subset of additional code branches into which the new source code should be automatically checked in. FIG. 9 illustrates a method 400 that demonstrates how an automatic check of source code could be performed for a code branch. The method 400 could be repeated for each code branch in the subset. Assume for the discussion below that source code has been checked in to the v3.3 code branch, and that the v3.4 code branch is included in the subset of code branches into which the new source code is to be automatically checked in.

The method 400 can be used to determine which files in the v3.4 code branch will be updated. The files of source code (i.e., "source code files") that are updated by the new application source code in a first code branch (here the v3.3 code branch) are identified (block 402). These are source code files that previously existed in the v3.3 code branch that are updated by the new application source code. Assume that there are 100 source code files, 3 of which were updated by a check in to the v3.3 branch. The analysis of block 402 would identify those three source code files.

For each identified source code file, a determination is made of whether a corresponding file in the second code branch (here the v3.4 branch) needs an update by comparing the existing source file in the v3.4 code branch to the updated file in the v3.3 branch, and determining a delta change (block 404). It may occur that one of the 3 files has already been updated. If the delta change for any of the 3 files indicated that those files did not need an update, then no update would be attempted for that file (but the remaining two files could still be updated). However, for the discussion below assume that each of the 3 files had a delta change indicating that an update was needed.

The patch integrator 22 attempts to merge the changes of new application source code into these 3 source code files in the v3.4 branch (block 406). If the merge of any of the source code files was unsuccessful for some reason (a "No" to block 408), then a notification could be transmitted that manual conflict resolution is needed (block 410). Thus, in one or more embodiments the method 100 includes, if an attempted automatic check in of the new source code into a particular one of the plurality of code branches fails, transmitting a notification that manual (i.e., non-automatic) resolution is required to incorporate the new source code into the particular code branch. If that occurred, the automatic check in for the branch may be aborted (even if updates had not yet been attempted on all files identified in block 402).

However, if all attempted merges for the v3.4 branch succeed (a "Yes" to block 408), then the new test case source code of the v3.3 branch (if any exists) would also be incorporated into the v3.4 branch (block 412), and the patch integrator 20 would instructs a test environment (e.g., build system 16) to execute test cases for the updated v3.4 code branch (block 414), and the code coverage data for the updated v3.4 code branch is stored in the code coverage repository 22.

Figure 10:
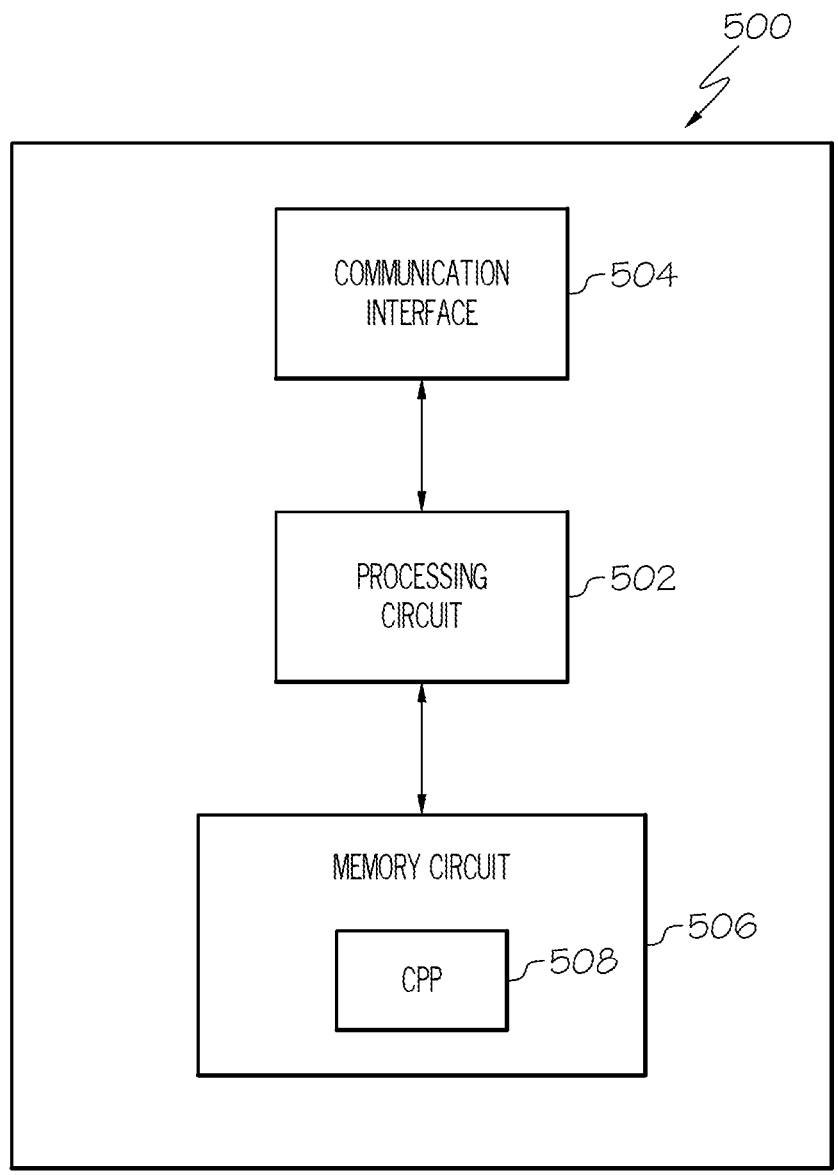
FIG. 10 illustrates an example computing device configured to automatically check in source code to a plurality of code branches of a software application.

FIG. 10 illustrates a computing device 500 configured as the patch integrator 20. The computing device 500 may be configured to implement any combination of the techniques discussed above. The computing device 500 includes a communication interface 504 and one or more processing circuits (shown as "processing circuit" 502) that are communicatively connected to the communication interface 504. The computing device 500 is configured to communicate with the source code repository 12, defect management system 14, build system 16, and software testing management platform 18 via the communication interface 504.

The processing circuit 502 is configured to detecting that new source code linked to a defect identifier has been checked in to source code repository 12 for a given one of a plurality of code branches of a software application, wherein the new source code comprises new application source code and new test case source code, and wherein the defect identifier identifies a defect in the software application that the new application source code resolves and the new test case source code tests.

The processing circuit 502 is further configured to automatically check in the new source code to additional ones of the plurality of code branches based on the defect identifier. For each additional code branch into which the new source code is automatically checked in, the processing circuit 502 is configured to:

determine a first code coverage metric indicative of an extent to which application source code of the code branch was tested by its corresponding test case source code before the automatic check in of the new source code;

determine a second code coverage metric indicative of an extent to which application source code of the code branch is tested by its corresponding test case source code, which includes the new test case source code, after the automatic check in of the new source code; and if a difference between the first and second code coverage metrics indicates that code coverage for the code branch has decreased by more than a predefined threshold, transmit a notification that indicates a test case deficiency for the code branch.

The computing device 500 also includes a memory circuit 506 which is a computer readable storage medium that stores instructions for operation of the patch integrator 20. The memory circuit 506 may include the code coverage repository 22 and the exclusion list discussed above. Alternatively, the code coverage repository 22 could be stored in an external memory circuit (not shown) that is accessible by the computing device 500. In one or more embodiments, the memory circuit 506 includes a computer program product 508. The computer program product 508 comprises a computer readable storage medium (e.g., memory circuit 506, or some other storage device) having computer readable program code embodied therewith. The computer readable program code comprises computer readable program code configured to detect that new source code linked to a defect identifier has been checked in to a source code repository for a given one of a plurality of code branches of a software application, wherein the new source code comprises new application source code and new test case source code, and wherein the defect identifier identifies a defect in the software application that the new application source code resolves and the new test case source code tests.

The computer readable program code further comprises computer readable program code configured to automatically check in the new source code to additional ones of the plurality of code branches based on the defect identifier. The computer readable program code further comprises computer readable program code configured to, for each additional code branch into which the new source code is automatically checked in:

determine a first code coverage metric indicative of an extent to which application source code of the code branch was tested by its corresponding test case source code before the automatic check in of the new source code;

determine a second code coverage metric indicative of an extent to which application source code of the code branch is tested by its corresponding test case source code, which includes the new test case source code, after the automatic check in of the new source code; and if a difference between the first and second code coverage metrics indicates that code coverage for the code branch has decreased by more than a predefined threshold, transmit a notification that indicates a test case deficiency for the code branch.

In some embodiments, the computer program product also includes additional computer readable program code for configuring the computing device 500 to implement any combination of the techniques discussed above.

The methods and apparatus described herein may provide a number of benefits over prior art systems by helping effectively track, identify, merge and manage bug fixes across releases. The automatic identification and promotion of change sets among source code branches, along with the optional exclusion of certain branches from receiving such automatic updates, can alleviate some of the problems of maintaining multiple code branches and tracking bugs across those branches. Thus, these techniques may be particularly useful for agile software development where releases occur frequently. Of course, it is understood that agile software development is a non-limiting example, and that these techniques could even be used in conjunction with the previous "waterfall" software development methodology, for example.

Instead of requiring code to be manually merged into many code branches, which is tedious and error prone, the patch integrator 20 can perform this automatically, freeing up software development resources. The patch integrator 20 can effectively manage resolution of software defects that may span multiple builds and can enable automated delivery of fixes across build images with minimal overhead.

The unified tagging methodology described above, whereby software defects and the source code that resolve those defects can be tagged with a shared defect ID, can be used to provide integration among disparate software development tools from different vendors. Also, the techniques described above for identifying missing test cases and/or low code coverage can provide convenient notifications of occasions when more development effort needs to be focused on preparing test case source code.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A computer-implemented method comprising:
   detecting that new source code linked to a defect identifier has been checked in to a source code repository for a given one of a plurality of code branches of a software application, wherein the new source code comprises new application source code and new test case source code, and wherein the defect identifier identifies a defect in the software application that the new application source code resolves and the new test case source code tests;
   automatically checking in the new source code to additional ones of the plurality of code branches based on the defect identifier; and
   for each additional code branch into which the new source code is automatically checked in:
      determining a first code coverage metric indicative of an extent to which application source code of the code branch was tested by its corresponding test case source code before the automatic check in of the new source code;
      determining a second code coverage metric indicative of an extent to which application source code of the code branch is tested by its corresponding test case source code, which includes the new test case source code, after the automatic check in of the new source code; and
      if a difference between the first and second code coverage metrics indicates that code coverage for the code branch has decreased by more than a predefined threshold, transmitting a notification that indicates a test case deficiency for the code branch;
   detecting that additional source code linked to an additional defect identifier has been checked into the source code repository for a particular one of the plurality of code branches, wherein the additional source code comprises application source code but does not include any test case source code;
   automatically checking in the additional source code to additional ones of the plurality of code branches based on the additional defect identifier;
   querying a software testing management platform to determine if any test case source code is available for the additional defect identifier; and
   if no indication is received from the software testing management platform that indicates that test case source code is available for the additional defect identifier after either a predetermined amount of time or a predetermined amount of querying, transmitting a notification that indicates a test case deficiency for the additional defect identifier.

2. The computer-implemented method of claim 1, further comprising:
   determining a set of files in the given code branch that are updated by the new application source code; and
   determining which of the additional code branches that the new source code will be automatically checked in to based on the defect identifier, and also based on whether the set of files are already present in the additional ones of the plurality of code branches.

3. The computer-implemented method of claim 2, wherein said determining which of the additional code branches that the new source code will be automatically checked in to comprises:
   determining that the new source code should not be automatically checked in to one of the plurality of code branches if none of the files in the set of files are present in the code branch.

4. The computer-implemented method of claim 2, wherein the determining of which additional code branches the new source code will be automatically checked in to is further based on an exclusion list which indicates code branches into which application source code should not be automatically checked in.

5. The computer-implemented method of claim 2, further comprising:
   determining whether the new application source code includes any new files that were not included in the given code branch before the check in of the new source code;
   wherein said automatically checking in the new source code to additional ones of the plurality of code branches based on the defect identifier comprises:
      for each file in the set of files, determining what changes were made to the file by the new application source code, and merging those changes into existing files in the additional ones of the plurality of code branches; and if the new application source code includes a new file, adding the new file to the additional ones of the plurality of code branches.

6. The computer-implemented method of claim 1, further comprising:

determining a change set comprising files in the given code branch that are either updated or added by the check in of the new source code;

wherein neither of the first and second code coverage metrics reflects code coverage of files that are not present in the change set.

7. The computer-implemented method of claim 1, further comprising:

automatically updating a software testing management platform to reflect that additional test cases, which correspond to the new test case source code, are available for the additional ones of the plurality of code branches.

8. The computer-implemented method of claim 1, further comprising:

generating, based on the first and second code coverage metrics, a dashboard that displays historical code coverage data for the software application.

9. The computer-implemented method of claim 1, further comprising:

if an attempted automatic check in of the new source code into a particular one of the plurality of code branches fails, transmitting a notification that manual resolution is required to incorporate the new source code into the particular code branch.

10. A computing device comprising:

a memory circuit; and a processing circuit operatively connected the memory circuit and configured to:

detect that new source code linked to a defect identifier has been checked in to a source code repository for a given one of a plurality of code branches of a software application, wherein the new source code comprises new application source code and new test case source code, and wherein the defect identifier identifies a defect in the software application that the new application source code resolves and the new test case source code tests;

automatically check in the new source code to additional ones of the plurality of code branches based on the defect identifier; and for each additional code branch into which the new source code is automatically checked in:

determine a first code coverage metric indicative of an extent to which application source code of the code branch was tested by its corresponding test case source code before the automatic check in of the new source code;

determine a second code coverage metric indicative of an extent to which application source code of the code branch is tested by its corresponding test case source code, which includes the new test case source code, after the automatic check in of the new source code; and if a difference between the first and second code coverage metrics indicates that code coverage for the code branch has decreased by more than a predefined threshold, transmit a notification that indicates a test case deficiency for the code branch;

detect that additional source code linked to an additional defect identifier has been checked into the source code repository for a particular one of the plurality of code branches, wherein the additional source code comprises application source code but does not include any test case source code;

automatically check in the additional source code to additional ones of the plurality of code branches based on the additional defect identifier;

query a software testing management platform to determine if any test case source code is available for the additional defect identifier; and if no indication is received from the software testing management platform that indicates that test case source code is available for the additional defect identifier after either a predetermined amount of time or a predetermined amount of querying, transmit a notification that indicates a test case deficiency for the additional defect identifier.

11. The computing device of claim 10, wherein the processing circuit is further configured to:

determine a set of files in the given code branch that are updated by the new application source code; and determine which of the additional code branches that the new source code will be automatically checked in to based on the defect identifier, and also based on whether the set of files are already present in the additional ones of the plurality of code branches.

12. The computing device of claim 11, wherein to determine which of the additional code branches that the new source code will be automatically checked in to, the processing circuit is configured to:

determine that the new source code should not be automatically checked in to one of the plurality of code branches if none of the files in the set of files are present in the code branch.

13. The computing device of claim 11, wherein the determination of which additional code branches the new source code will be automatically checked in to is further based on an exclusion list which indicates code branches into which application source code should not be automatically checked in.

14. The computing device of claim 11, wherein the processing circuit is further configured to:

determine whether the new application source code includes any new files that were not included in the given code branch before the check in of the new source code;

wherein to automatically check in the new source code to additional ones of the plurality of code branches based on the defect identifier, the processing circuit is configured to:

for each file in the set of files, determine what changes were made to the file by the new application source code, and merge those changes into existing files in the additional ones of the plurality of code branches; and if the new application source code includes a new file, add the new file to the additional ones of the plurality of code branches.

15. The computing device of claim 10:

wherein the processing circuit is further configured to determine a change set comprising files in the given code branch that are either updated or added by the check in of the new source code;

wherein neither of the first and second code coverage metrics reflects code coverage of files that are not present in the change set.

16. The computing device of claim 10, wherein the processing circuit is further configured to:

automatically update a software testing management platform to reflect that additional test cases, which correspond to the new test case source code, are available for the additional ones of the plurality of code branches.

17. The computing device of claim 10, wherein the processing circuit is further configured to:

generate, based on the first and second code coverage metrics, a dashboard that displays historical code coverage data for the software application.

18. The computing device of claim 10, wherein the processing circuit is further configured to:

if an attempted automatic check in of the new source code into a particular one of the plurality of code branches fails, transmit a notification that manual resolution is required to incorporate the new source code into the particular code branch.

19. A computer program product comprising:

a non-transitory computer readable storage medium having computer readable program code stored thereon that, when executed by a processing circuit of a computing device, causes the device to:

detect that new source code linked to a defect identifier has been checked in to a source code repository for a given one of a plurality of code branches of a software application, wherein the new source code comprises new application source code and new test case source code, and wherein the defect identifier identifies a defect in the software application that the new application source code resolves and the new test case source code tests;

automatically check in the new source code to additional ones of the plurality of code branches based on the defect identifier; and for each additional code branch into which the new source code is automatically checked in:

determine a first code coverage metric indicative of an extent to which application source code of the code branch was tested by its corresponding test case source code before the automatic check in of the new source code;

determine a second code coverage metric indicative of an extent to which application source code of the code branch is tested by its corresponding test case source code, which includes the new test case source code, after the automatic check in of the new source code; and if a difference between the first and second code coverage metrics indicates that code coverage for the code branch has decreased by more than a predefined threshold, transmit a notification that indicates a test case deficiency for the code branch;

detect that additional source code linked to an additional defect identifier has been checked into the source code repository for a particular one of the plurality of code branches, wherein the additional source code comprises application source code but does not include any test case source code;

automatically check in the additional source code to additional ones of the plurality of code branches based on the additional defect identifier;

query a software testing management platform to determine if any test case source code is available for the additional defect identifier; and if no indication is received from the software testing management platform that indicates that test case source code is available for the additional defect identifier after either a predetermined amount of time or a predetermined amount of querying, transmit a notification that indicates a test case deficiency for the additional defect identifier.

* * * * *